United States Patent Office 3,170,135
Patented Feb. 16, 1965

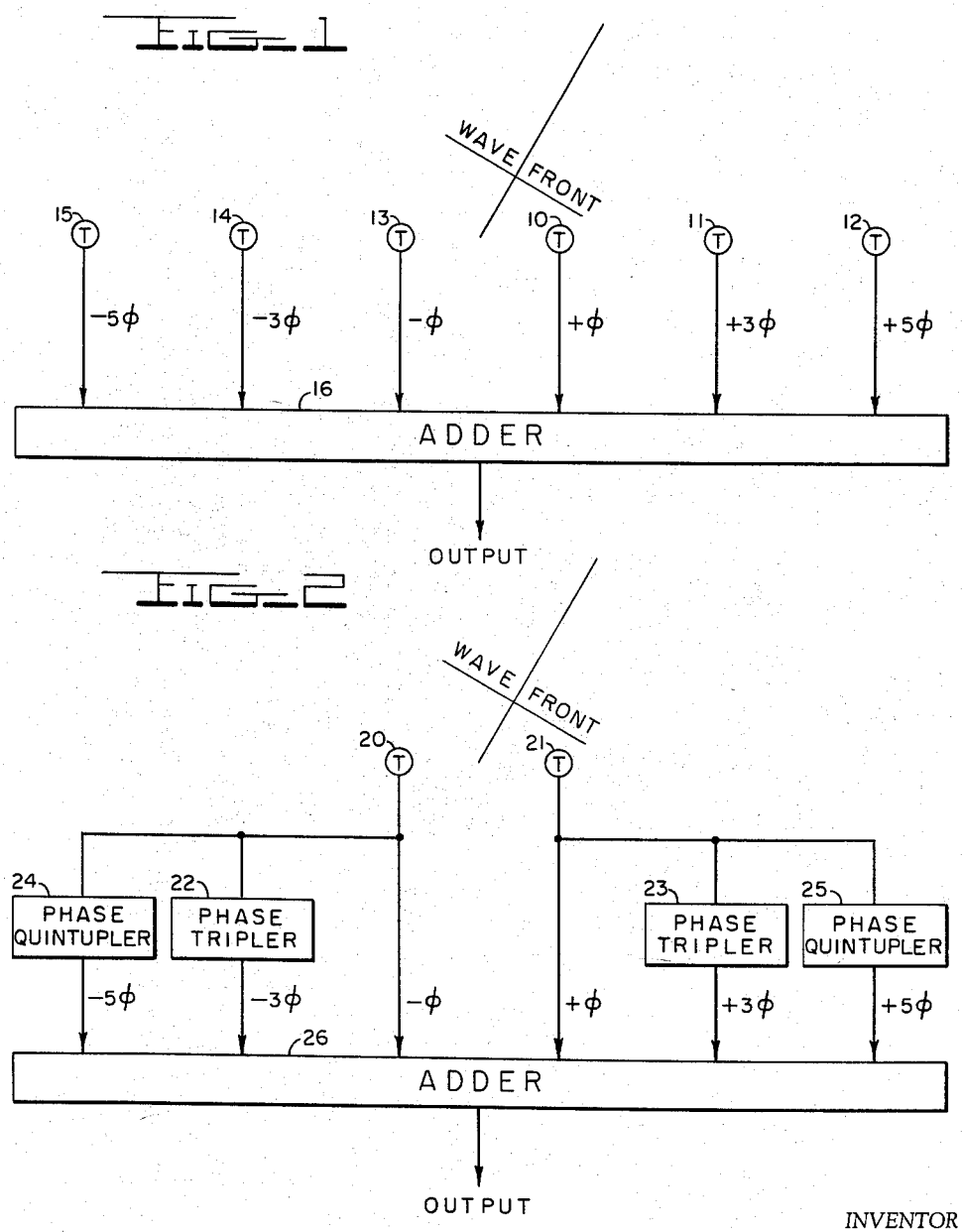

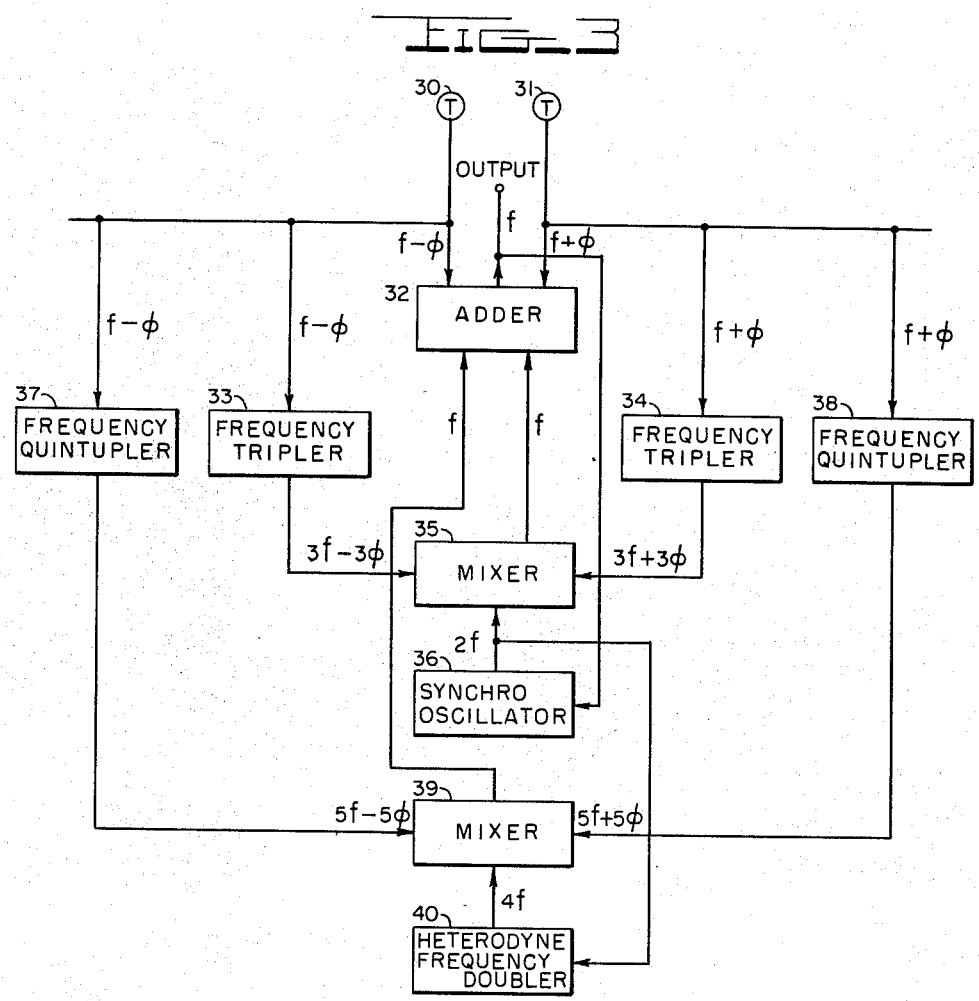

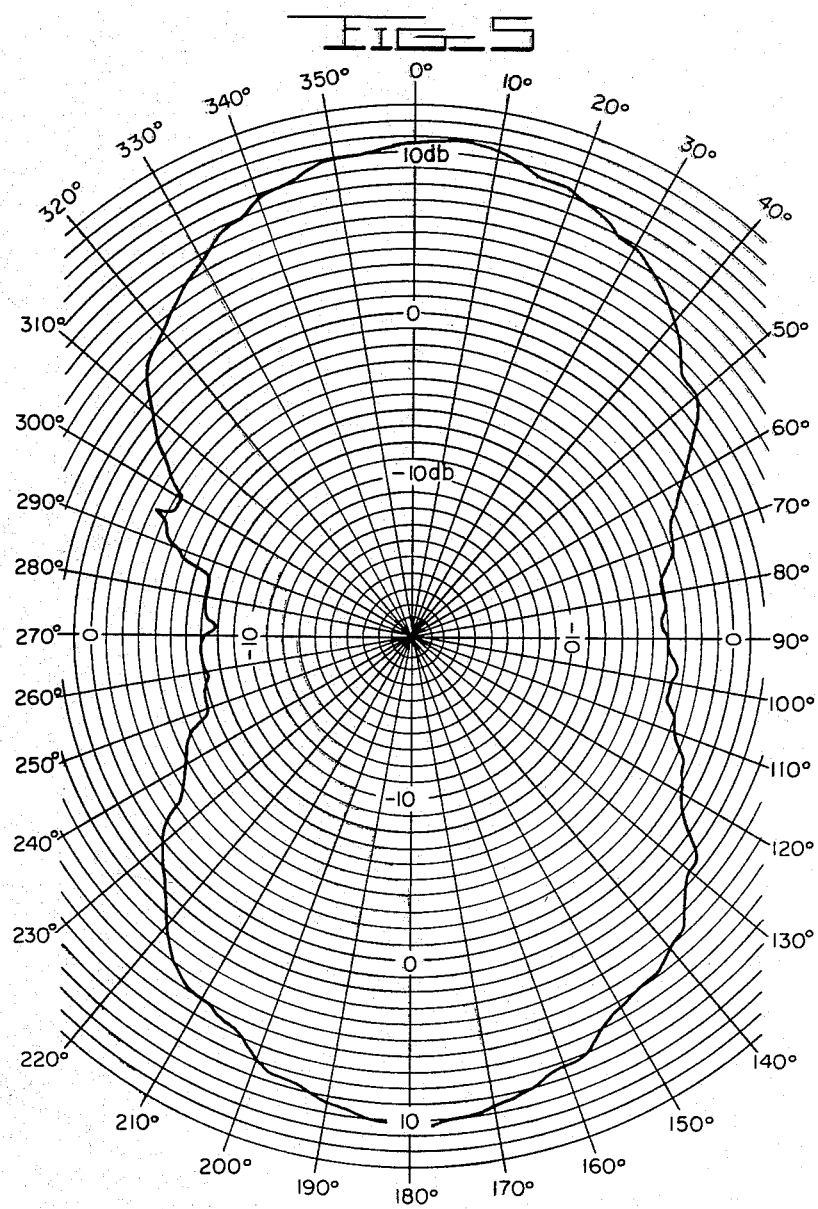

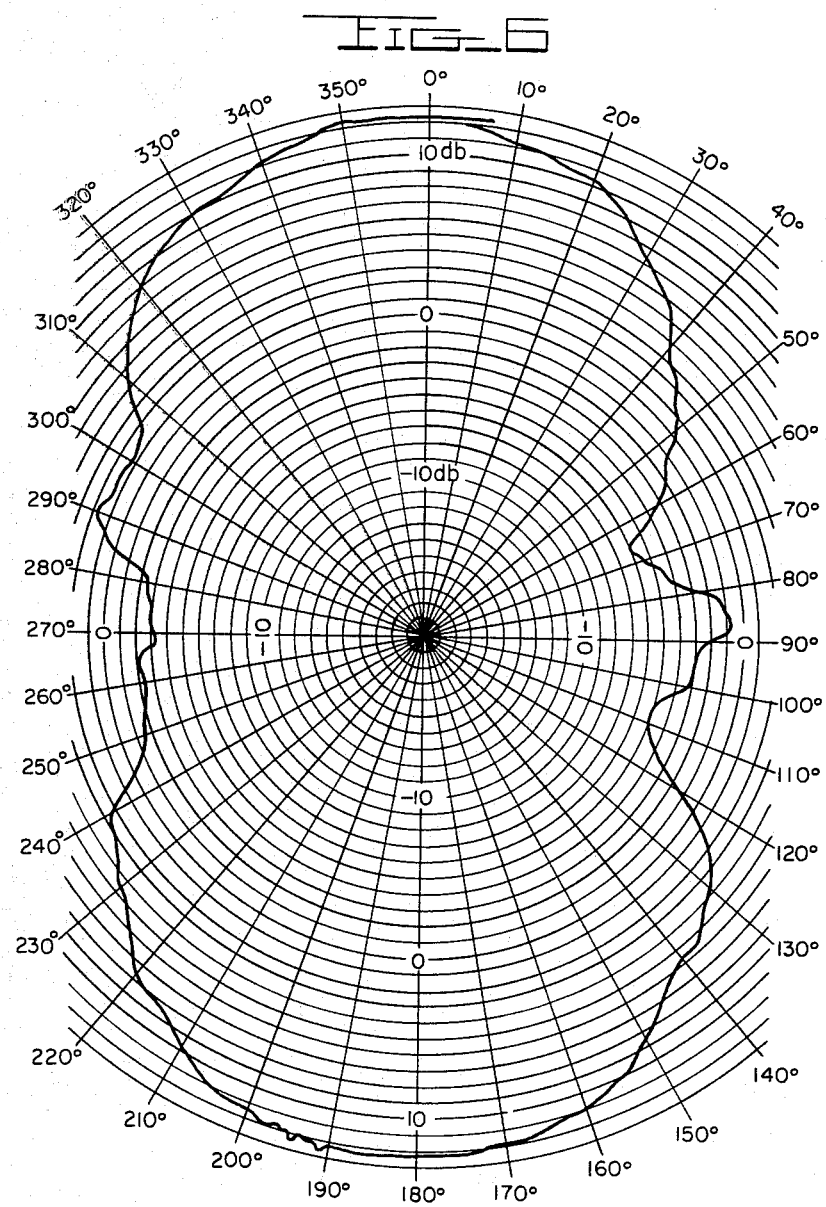

3,170,135
PHASE MULTIPLIER TRANSDUCER ARRAY
John J. Yagelowich, Washington, D.C., assignor to the United States of America as represented by the Secretary of the Navy
Filed Jan. 19, 1962, Ser. No. 167,454
2 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

The present invention relates to a directoinal receiving system for underwater sound signals. More particularly the invention provides an electronic circuit in combination with a few hydrophones to simulate the results obtained with a large array of many hydrophones.

It is well known that the directivity of a sound receiving system is a function of the dimensions of the array of sound transducers with which it is supplied. The greater the overall dimensions of the array, the greater will be its directivity. In general the greatest amount of information on the position of a sound source is obtained by equally spacing the allotted number of transducers in the array. Also the ability of the system to distinguish between two adjacent sound sources is greatly enhanced by using a large number of transducers, so that the spacing between transducers is as small as possible, preferably less than a half-wavelength.

The above requirements impose severe limitations on certain types of systems. For example, it has been found that low frequency sound sources, i.e., a few kilocycles per second and less, can be detected with accuracy over much greater distances than sources of higher frequency. However, to obtain useful directivities an array should extend at least a few wavelengths, so that the array itself becomes bulky and unmanageable at these low frequencies. Such arrays are difficult to rotate for a searchlight effect and are often too large to be carried by submarines or homing torpedoes.

An object of the present invention is therefore to provide a compact array using a few sound transducers which duplicates the performance of a larger array of many transducers.

A further object of the invention is to provide an electronic network for use with a pair of spaced sound transducers for generating and combining with the signals from said pair, a plurality of signals displaced in time phase by an integral multiple of the phase displacement of signals from said pair.

A further object of the invention is to provide a simple circuit for multiplying the phase displacement between two signals.

These and other objects and many of the attendant advantages of this invention will be readily appreciated as the same becomes better understood by reference to the following detailed description when considered in connection with the accompanying drawings wherein:

FIG. 1 shows a block diagram of a conventional multi-transducer array;

FIG. 2 shows a block diagram of the transducer array according to the present invention;

FIG. 3 shows a more detailed block diagram of the transducer array of the invention;

FIG. 5 shows a graph of the output amplitude as a function of incident angle of received wavefronts for a pair of transducers spaced a half wavelength apart with the individual transducer outputs added directly;

FIG. 6 shows a similar graph but with the transducers spaced one sixth of a wavelength apart and the relative phase of the individual transducers tripled.

Figure 4:
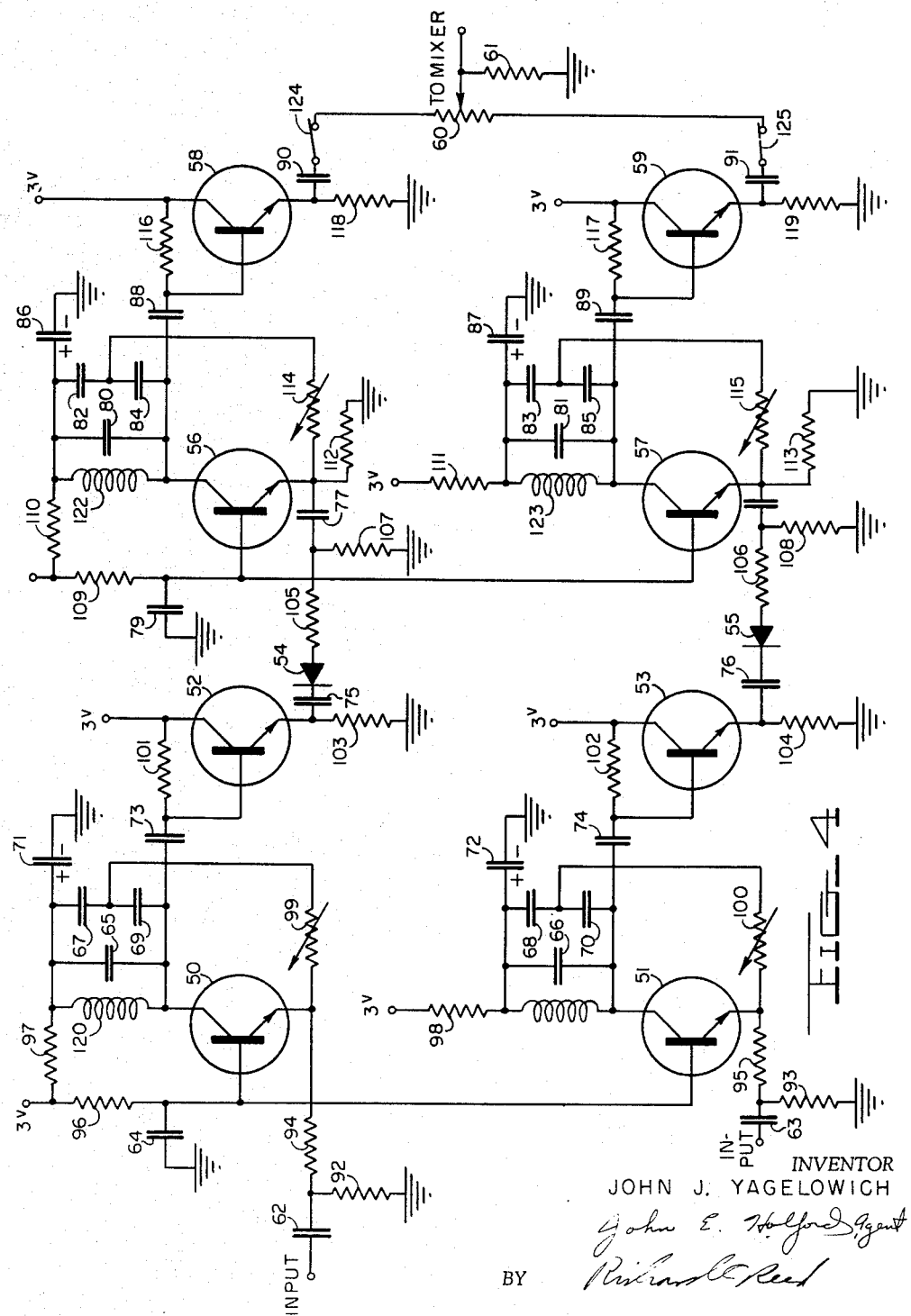
FIG. 4 shows a circuit diagram of a pair of frequency multipliers for use in the array of FIG. 3.

Referring to FIG. 1 there is shown a conventional array of transducers equally spaced apart with their outputs added directly. For a wavefront arriving at an angle as shown, signals are generated in each of the transducers with a time phase relative to incidence of the wavefront at the center of the array which may be expressed as multiples of a basic unit $\phi$. This unit is twice the phase difference between two adjacent transducers and for the angle shown is positive or leading for the transducers 10–12 to the right of center and negative or lagging for transducers 13 through 15 to the left. By keeping the spacing close enough so that the unit corresponds to the time required for a quarter cycle or less at the signal frequency, a unique phase relationship between each adjacent pair of transducers is obtained as the wave front varies 90° in either sense from normal incidence.

The signals are combined without disturbing their phase relationships in the adder 16. The latter may be a simple passive network, but generally is more sophisticated. It is usually desirable, for example, that the transducers be electrically isolated and that the signals from each be identical in amplitude. This is simply accomplished by providing a separate amplifier for each transducer, the amplifiers all supplying a common output. Numerous arrangements of this type appear in the literature.

By simple mathematics it can be shown that the strongest output is produced by normal incidence of the wave and that progressively weaker ones are obtained as a direct function of the deviation from incidence. The wave fronts which arrive at angles greater than 90° from incidence have been ignored since the physical structure is symmetrical.

The same signal will be received from targets separated by 180°, but one can be eliminated by using transducers with moderate directivity or a suitable baffle parallel to the array.

The above discussion and those to follow relate to a one dimensional array, but it should be immediately apparent to those skilled in the art that the same theory applies equally to two dimensional arrays.

FIG. 2 shows the general structure of applicant's novel array. The wave energy is received by a single pair of transducers 20 and 21. The signals from the transducers supply the values normally associated with the angle of incidence. These same signals are fed through a pair of phase triplers 22 and 23, a pair of phase quintuplers 24 and 25, and as many higher odd order multipliers as desired, depending on the size array that is to be simulated. The output of each of the phase multipliers is combined with the direct signals from the transducers by means of an adder 26 similar to that described in connection with FIG. 1. The output signal from the array in FIG. 2 should be exactly the same as that from the FIG. 1 array.

FIG. 3 shows the phase multiplier arrangement in greater detail. Signals from transducers 30 and 31 are directly combined in adder 32 along with additional signals which will be discussed further. The adder as previously mentioned may be a conventional network of passive elements or a plurality of amplifiers with separate inputs and a common output.

Additional signals fed into the adder 32 are obtained by further processing of the same transducer signals. A first pair of signals is obtained at three times the frequency of each signal using triplers or harmonic generators 33 and 34. Since the time delay between the signals remains the same the relative phase difference is also tripled. The signals thus multiplied are combined in a mixer or modulator 35.

In order to return the resultant signal to its original frequency, a locally generated second harmonic signal from a synchronized oscillator 36 is injected at the same time. Since the tripled signals are the same frequency they may be combined in a passive network, but the resultant is combined with the second harmonic signal by intermodulation using, for example, one of the circuits described by Lloyd P. Hunter in Handbook of Semiconductor Electronics, published 1956 by McGraw-Hill, pp. 12–27 through 12–29. The mixer includes a low pass output filter with a cutoff just above the fundamental frequency from transducers 30 and 31.

Still other signals are obtained by multiplying the frequency of the transducers by five with quintuplers 37 and 38 and combining them in mixer 39 with the signal from oscillator 36 multiplied by two in heterodyne frequency doubler 40. This structure can be extended using higher odd order frequency multipliers at the outputs of each of the transducers until the desired size of array is simulated. Instead of the doubler 40 each additional pair of odd order multipliers requires a heterodyne multiplier of one higher magnitude; i.e., seventh order require a tripler, ninth order require a quadrupler, etc.

By synchronizing the oscillator 36 to the output signal of adder 32, the mixer outputs are prepared for combination. The added output has no phase shift relative to the signal at the center of the array as do each of the mixer outputs, hence the phase synchronized local oscillator signals contribute no phase shifts to these signals. Doppler shift or other information conveyed by the frequency of the incoming signal is thus preserved in the output signal.

The form in which directional information is carried by the signals varies as the signals pass through the circuits. Prior to the emergence of signals from the frequency multipliers the information is entirely in the relative phase of the signals, and their relative amplitudes may be ignored. Before the hydrophone signals are applied to the mixers, however, their amplitudes at each mixer are carefully equalized or carefully shaded depending on the desired mode of operation. The relative amplitudes of all signals applied to the mixer circuits are thereafter maintained as constant as possible with the local oscillator preferably at a much greater amplitude than the hydrophone signals. After mixing the directional information appears in the absolute and relative amplitudes of the mixer outputs, the outputs preferably having the same phase. Maintaining the symmetry of the system as shown in FIG. 3 will insure that the mixer outputs are cophasal for application to the adder.

The output of the adder is fed to a suitable display device, for example, the deflection plates or intensity grid of a cathode ray oscilloscope, where its amplitude and other characteristics may be observed.

FIG. 4 shows a circuit diagram of a pair of frequency multipliers suitable for use in the circuit of FIG. 3. The signals from each of the hydrophones are applied to the input of one of the tuned transistor amplifiers 50 and 51. The output of the tuned amplifiers is coupled through emitter followers 52 and 53 to diode peak clippers 54 and 55 producing outputs which are rich in harmonic content. The desired harmonics are next extracted by means of tuned amplifiers 56 and 57. Finally the harmonic output from these last amplifiers are coupled through a second set of emitter followers 58 and 59, to a passive adder composed of resistors 60 and 61.

The values of the circuit elements are given in the following table.

*Table 1*

Transistors:
  50, 51, 52, 53, 56, 57, 58+59 _____ Type 2N35.
Diodes:
  54+55 _____ Type 1N35.

Capacitors:
  62+63 _____ 0.5 mfd.
  64 _____ 0.25 mfd.
  65+66 _____ 150 mmfd.
  67+68 _____ 0.03 mfd.
  69+70 _____ 0.003 mfd.
  71+72 _____ 10 mfd. electrolytic.
  73+74 _____ 820 mmfd.
  75+76 _____ 0.5 mfd.
  77+78 _____ 1.0 mfd.
  79 _____ 0.25 mfd.
  80+81 _____ 100 mmfd.
  82+83 _____ 0.01 mfd.
  84+85 _____ 750 mmfd.
  86+87 _____ 10 mfd.
  88+89 _____ 820 mmfd.
  90+91 _____ 1.0 mfd.
Resistors:
  92+93 _____ 470 ohm.
  94+95 _____ 10K ohm.
  96 _____ 1.0K ohm.
  97+98 _____ 1.8K ohm.
  99+100 _____ 1 megohm.
  101+102 _____ 1.0K ohm.
  103+104 _____ 10K ohm.
  105+106 _____ 10K ohm.
  107+108 _____ 1.0K ohm.
  109 _____ 1.0K ohm.
  110+111 _____ 1.8K ohm.
  112+113 _____ 10K ohm.
  114+115 _____ 14K ohm.
  116+117 _____ 1.0K ohm.
  118+119 _____ 10K ohm.
  60 _____ 10K ohm.
  61 _____ 10K ohm.
Inductors:
  120+121 _____ 2.0 henries.
  122+123 _____ 0.75 henry.

The input amplifiers 50 and 51 were designed to operate with a 10 millivolt signal at 2 kilocycles. The second harmonically tuned amplifiers 56 and 57 were tuned to the third harmonic or 6 kilocycles.

With different values for the tuned collector circuit elements of the harmonic amplifier, the circuit works equally well for a doubler, quadrupler or quintupler. Tests indicate that even higher multiplications are possible. Using two or more multipliers in cascade, any multiplication can be obtained.

To operate the circuit only a few adjustments need be made. The feedback resistors 99, 100, 114 and 115 are adjusted to provide the highest possible "Q" for the particular frequencies desired. The diodes 54 and 55 are preselected to provide matched attenuation characteristics. The switches 124 and 125 are opened one at a time in alternation and resistor 60 is adjusted until the outputs in each case are balanced. The resultant output signal is then ready for heterodyning in the mixer shown in FIG. 3. The heterodyne circuit or mixer, preferably, is a transistor or crystal diode type, many of which appear in the literature.

FIGS. 5 and 6 show the test patterns obtained using two hydrophones spaced a half-wavelength apart and one sixth wavelengths apart, respectively, the latter using a phase tripler. Note the similarity of the patterns. Equivalent results were obtained with the phase quintupler, indicating that the theory would apply to higher multiplications. Since the pattern from an array is merely the geometrical combination of these patterns these tests indicate the accurate simulation of an array two and a half wavelengths long using an array only a sixth of a wavelength in extent.

The invention may be made in many other forms than as specifically described. The hydrophones for example may be transducers for both sending and receiving with suitable circuitry for isolating the two functions. Such circuitry is well known to those skilled in the art of sonar echo ranging. Vacuum tubes, tunnel diodes, or equivalent devices may replace some or all of the transistors. Simulation of a six element array has been discussed, but in practice this number will probably be much greater. Beam steering can be achieved using a single phase shifter in path to and from one of the hydrophones, a great advantage over multihydrophone arrays.

Obviously many modifications and variations of the present invention are possible in the light of the above teachings. It is therefore to be understood that within the scope of the appended claims the invention may be practiced otherwise than as specifically described.

What is claimed is:

1. A directional sound detecting apparatus comprising, a first sound to electrical signal transducer, a second sound to electrical signal transducer spaced an integral distance from said first transducer whereby sound phase fronts, which do not strike both transducers simultaneously induce signals having equal and opposite integral angular initial phase shifts in said transducers relative to a signal measured midway between said transducers, a plurality of multiplying means connected to each of said transducers for producing a plurality of signals each having different phase shifts, larger than said initial phase shifts by an integral factor, and each being capable of generating harmonics of the fundamental frequency each of the transducer's output signals, mixer means connected to said multiplying means wherein the multiplied signals from said transducers having the same frequencies are combined, oscillator means, generating harmonics of said fundamental frequency, connected to said mixer means wherein said harmonic signal is injected into said mixer at the same time the multiplied signals are combined in said mixer thereby returning the resultant multiplied signal to its original frequency, and adder means connected to said transducers and mixer means wherein signals from said transducers and mixer means are added.

2. A directional sound detecting apparatus as recited in claim 1, wherein said oscillator means includes heterodyne means for converting the output frequency from at least one of said mixer means to said fundamental frequency.

References Cited by the Examiner
UNITED STATES PATENTS

| | | | |
|---|---|---|---|
| 2,448,824 | 10/49 | Hansel | 343—113 |
| 2,548,671 | 4/51 | Kreer | 343—113 |
| 2,580,803 | 1/52 | Logan. | |
| 2,642,473 | 6/53 | Kreer. | |
| 2,770,728 | 11/56 | Herzog | 321—60 X |
| 2,809,239 | 10/57 | Nielson | 321—60 X |

KATHLEEN H. CLAFFY, *Primary Examiner.*

CHESTER L. JUSTUS, *Examiner.*